US006678672B1

(12) United States Patent
Ramasamy et al.

(10) Patent No.: US 6,678,672 B1
(45) Date of Patent: Jan. 13, 2004

(54) EFFICIENT EXCEPTION HANDLING DURING ACCESS PLAN EXECUTION IN AN ON-LINE ANALYTIC PROCESSING SYSTEM

(75) Inventors: Karthikeyan Ramasamy, Madison, WI (US); Prasad Manikarao Deshpande, Madison, WI (US); Amit Shukla, Madison, WI (US); Jeffrey F. Naughton, Madison, WI (US)

(73) Assignee: NCR Corporation, Dayton, OH (US)

( * ) Notice: Subject to any disclaimer, the term of this patent is extended or adjusted under 35 U.S.C. 154(b) by 450 days.

(21) Appl. No.: 09/584,510

(22) Filed: May 31, 2000

(51) Int. Cl.[7] ............................................. G06F 17/30
(52) U.S. Cl. ................................. 707/2; 707/3; 707/10
(58) Field of Search .............................. 707/1, 2, 3, 4, 707/5, 8, 100, 101, 10

(56) References Cited

U.S. PATENT DOCUMENTS

| | | | | |
|---|---|---|---|---|
| 5,428,807 A | * | 6/1995 | McKeen et al. .............. 712/216 |
| 5,680,603 A | * | 10/1997 | Bhargava et al. ............... 707/2 |
| 5,717,919 A | * | 2/1998 | Kodavalla et al. ............ 707/10 |
| 5,778,219 A | * | 7/1998 | Amerson et al. ............. 712/244 |
| 5,855,012 A | * | 12/1998 | Bhargava et al. ............... 707/2 |
| 5,857,180 A | * | 1/1999 | Hallmark et al. ............... 707/2 |
| 5,937,401 A | * | 8/1999 | Hillegas ........................ 707/10 |
| 5,940,819 A | * | 8/1999 | Beavin et al. ................ 707/101 |
| 6,021,405 A | * | 2/2000 | Celis et al. ..................... 707/2 |
| 6,243,710 B1 | * | 6/2001 | DeMichiel et al. ........... 707/10 |
| 6,349,310 B1 | * | 2/2002 | Klein et al. .................. 707/100 |
| 6,421,663 B1 | * | 7/2002 | Chen et al. ..................... 707/2 |
| 6,434,544 B1 | * | 8/2002 | Bakalash et al. ............. 707/10 |

OTHER PUBLICATIONS

N. Kabra and D.J. DeWitt, (1999) "OPT ++: an object–oriented implementation for extensible database query optimization," The VLDB Journal 8:55–78.

* cited by examiner

Primary Examiner—Greta Robinson
Assistant Examiner—Miranda Le
(74) Attorney, Agent, or Firm—Gates & Cooper (57) ABSTRACT

An On-Line Analytic Processing (OLAP) system converts queries into an operator tree comprised of a plurality of operators, wherein each of the operators is independently executed. When an exception is detected in one or more of the independently executed operators, the exception is propagated to the remaining operators of the operator tree by recycling empty data pages, piggybacking the detected exceptions on the recycled data pages, and sending the recycled data pages both upstream and downstream in the operator tree to the remaining operators of the operator tree. The propagated exceptions are delivered to the remaining operators, without interrupting the operators, at one or more points at which the operator normally reads or writes data from its input stream. Finally, the operators are terminated using a depth-first traversal of the operator tree.

30 Claims, 7 Drawing Sheets

```
SELECT PRODUCT.NAME, AVG(SALES.TOTAL), SUM(SALES.TOTAL)
FROM PRODUCT, SALES
WHERE PRODUCT.NO = SALES.PRODUCTNO
```

FIG. 6C ated from only one or a few of the operators. This specification examines the question of how to handle exceptions for different, concurrently running operators of a query in a way that will coordinate the total query response.

EFFICIENT EXCEPTION HANDLING DURING ACCESS PLAN EXECUTION IN AN ON-LINE ANALYTIC PROCESSING SYSTEM

CROSS REFERENCE TO RELATED APPLICATIONS

This application is related to the following and commonly assigned patent applications, all of which are incorporated by reference herein:

application Ser. No. 09/583,633, entitled "SIMULTANEOUS COMPUTATION OF MULTIPLE MOVING AGGREGATES IN A RELATIONAL DATABASE MANAGEMENT SYSTEM," filed on May 31, 2000, by Kartikeyan Ramasamy, Prasad M. Deshpande, Amit Shukla, and Jeffrey F. Naughton;

application Ser. No. 09/605,202, entitled "METHOD FOR DETERMINING THE COMPUTABILITY OF DATA FOR AN ACTIVE MULTI-DIMENSIONAL CACHE IN A RELATIONAL DATABASE MANAGEMENT SYSTEM," filed on Jun. 27, 2000, by Prasad M. Deshpande, Karthikeyan Ramasamy, Amit Shukla, and Jeffrey F. Naughton;

application Ser. No. 09/583,364, entitled "ACTIVE CACHING FOR MULTI-DIMENSIONAL DATA SETS IN A RELATIONAL DATABASE MANAGEMENT SYSTEM," filed on May 31, 2000, by Prasad M. Deshpande, Karthikeyan Ramasamy, Amit Shukla, and Jeffrey F. Naughton; and application Ser. No. 09/449,085, entitled "QUERY MONITOR PLAYBACK MECHANISM FOR POSTMORTEM PERFORMANCE ANALYSIS," filed on Nov. 24, 1999, by Karthikeyan Ramasamy, Jie-Bing Yu, and Jun Li.

BACKGROUND OF THE INVENTION

1. Field of the Invention

This invention relates in general to database management systems performed by computers, and in particular, to the efficient handling of exceptions during access plan execution in an On-Line Analytic Processing (OLAP) system.

2. Description of Related Art

On-Line Analytical Processing (OLAP) systems provide tools for analysis of multidimensional data. Most systems are built using a three-tier architecture, wherein the first or client tier provides a graphical user interface (GUI) or other application, the second or middle tier provides a multidimensional view of the data, and the third or server tier comprises a relational database management system (RDBMS) that stores the data.

Most queries in OLAP systems are complex and require access to large amounts of data. However, decision support applications in OLAP systems need to be interactive and demand fast response times. Different techniques to speed up queries have been studied and implemented, both in research and industrial systems.

Performance improvements have been assisted by enhancements to query processing schemes, such as parallel processing schemes that divide a query into smaller sub-units, each of which can be assigned to different processors, threads, or processes. These parallel processing schemes greatly increase the performance of OLAP systems, and ensure that queries are executed as quickly as possible.

Although the benefits of employing parallelism are widely known, it has also been noticed that increasing the degree of parallelism also increases the problems with exception handling. For example, when a large number of operators for a query are executed simultaneously, it may be very difficult to coordinate the operators when handling exceptions generated from only one or a few of the operators. This specification examines the question of how to handle exceptions for different, concurrently running operators of a query in a way that will coordinate the total query response.

SUMMARY OF THE INVENTION

A method, system and article of manufacture for performing queries in an in an On-Line Analytic Processing (OLAP) system. The method, system and article of manufacture provide improved handling of exceptions for different, concurrently running operators of a query in a way that will coordinate the total query response. The method comprises the steps of: (a) translating a query into an operator tree comprised of a plurality of operators; (b) independently executing each of the operators in the operator tree; (c) detecting an exception in one or more of the independently executed operators of the operator tree; and (d) propagating the detected exceptions to remaining ones of the independently executed operators of the operator tree by recycling empty data pages, piggybacking the detected exceptions on the recycled data pages, and sending the recycled data pages to the remaining ones of the independently executed operators of the operator tree in a bi-directional flow, wherein the detected exceptions are propagated downward as well as upward the operator tree. The system and article of manufacture embody logic for performing the method steps described above.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The present invention provides a solution for the efficient handling of exceptions during access plan execution in a relational database management system (RDBMS). In the RDBMS, a query is converted into an operator tree which, after further processing, is transformed into an access plan. The access plan specifies the operators to be executed, the expressions and predicates to be evaluated, and the aggregations to be performed. Furthermore, the access plan expresses the dependencies between operators by organizing the nodes representing the operators in the form of a tree. The operator tree is executed by generating an instance of the appropriate operator for each node in the tree, with each of these operator instances executing in an independent thread. Streams connect these instances and move data from one operator to another operator in a pipelined fashion. Finally, the results are pipelined to a client application in tandem with the execution of the operators.

Since the operators are executed independently, there is a need for dynamically propagating exceptions, such as abnormal conditions or errors, from a source operator to related operators. It is also necessary that the propagation not affect other operators executing different queries.

Generally, the present invention includes four main functions:

Detection—Exceptions can occur because of various reasons: resource exhaustion, a client application choosing to abort, corrupted values in tuples during expression evaluation, etc.

Propagation—Exceptions can occur in an operator located anywhere in the tree, and have to be propagated to the operators transitively feeding to the operator (downstream), as well as to operators transitively fed from the operator (upstream).

Delivery—Since each operator executes a synchronously in a separate thread, delivery of the exception is performed in an efficient manner without effecting the performance of the operator.

Termination—Once the exception is delivered, the operators are terminated and resources held by each operator are released.

These and other aspects of the present invention are described in more detail below.

HARDWARE AND SOFTWARE ENVIRONMENT

Figure 1:
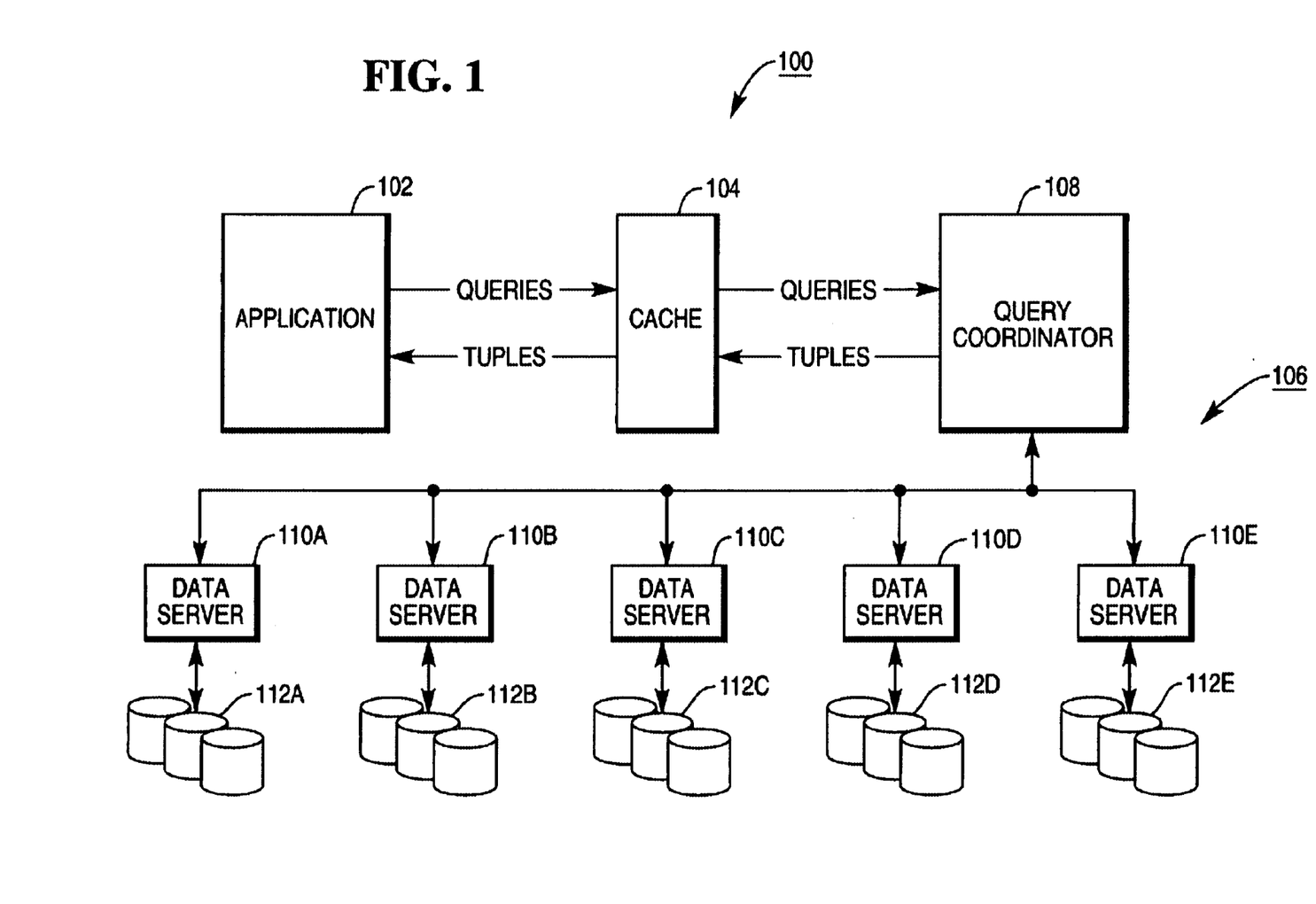
FIG. 1 illustrates an exemplary hardware and software environment that could be used with the present invention.

FIG. 1 illustrates an exemplary hardware and software environment that could be used with the present invention. In the exemplary environment, a computer system 100 implements an OLAP (On-Line Analytic Processing) system in a three-tier client-server architecture, wherein the first or client tier provides a graphical user interface (GUI) or other application 102, the second or middle tier provides a cache 104 for storing multi-dimensional data, and the third or server tier comprises a relational database management system (RDBMS) 106 that generates the multi-dimensional data from tables stored in a relational database. The first, second, and third tiers may be implemented in separate machines, or may be implemented as separate or related processes in a single machine.

In the preferred embodiment, the RDBMS 106 includes a query coordinator 108 and one or more data servers 110A–110E storing the relational database in one or more data storage devices 112A–112E. The query coordinator 108 and data servers 110 may be implemented in separate machines, or may be implemented as separate or related processes in a single machine. The RDBMS 106 used in the preferred embodiment comprises the Teradata® RDBMS sold by NCR Corporation, the assignee of the present invention.

In the preferred embodiment, the system 100 may use any number of different parallelism mechanisms. Tables within the relational database may be fully partitioned across all data storage devices 112 in the system 100 using hash, range, value, or other partitioning methods. Generally, the data servers 110 perform operations against the relational database in a parallel manner as well.

Generally, the application 102, cache 104, RDBMS 106, query coordinator 108, and/or data servers 110A–110E comprise logic and/or data tangibly embodied in and/or accessible from a device, media, carrier, or signal, such as RAM, ROM, one or more of the data storage devices 112A–112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

EXECUTION OF SQL QUERIES

Figure 2:
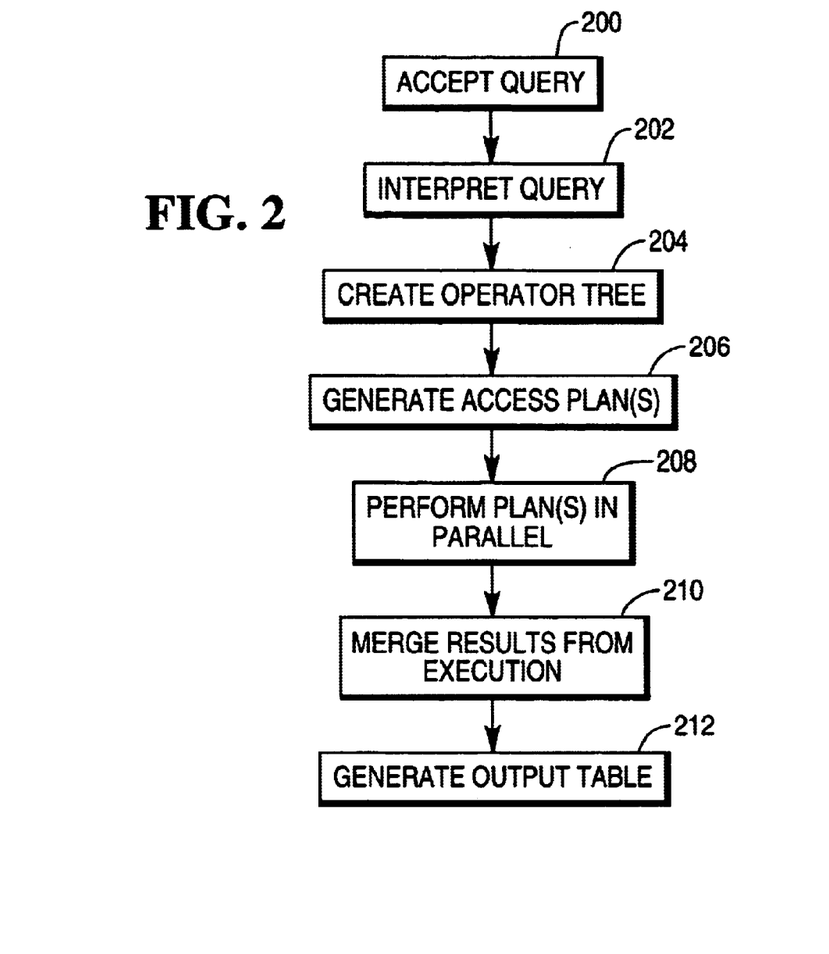
FIG. 2 is a flowchart that illustrates the general processing of queries according to the preferred embodiment of the present invention.

FIG. 2 is a flow chart illustrating the steps necessary for the interpretation and execution of queries or other user interactions, either in a batch environment or in an interactive environment, according to the preferred embodiment of the present invention.

Block 200 represents a query being accepted by the query coordinator 108.

Block 202 represents the query coordinator 108 transforming the query into an operator tree.

Block 204 represents the query coordinator 108 generating one or more access plans from the operator tree.

Block 206 represents the query coordinator 108 parallelizing the access plans, and then transmitting the access plans to their assigned data servers 110.

Block 208 represents the data servers 110 performing the required data manipulation associated with the access plans received from the query coordinator 108, wherein the access plans are performed in parallel by the data servers 110.

Block 210 represents the query coordinator 108 then merging the results received from the data servers 110, and optionally storing the results into the data cache 104.

Block 212 represents the output or result table being generated from the merged results, so that the responses can ultimately be delivered to the application 102.

OPERATOR TREES AND ACCESS PLANS

Figure 3:
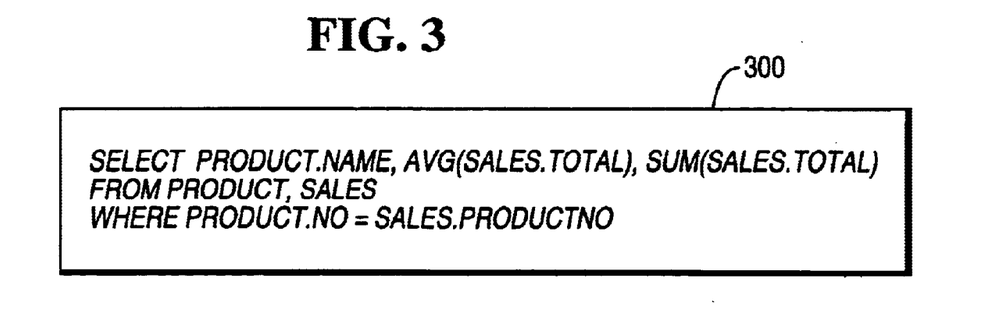
FIGS. 3, 4, and 5 present an example SQL query, an associated operator tree, and an associated access plan.
Figure 4:
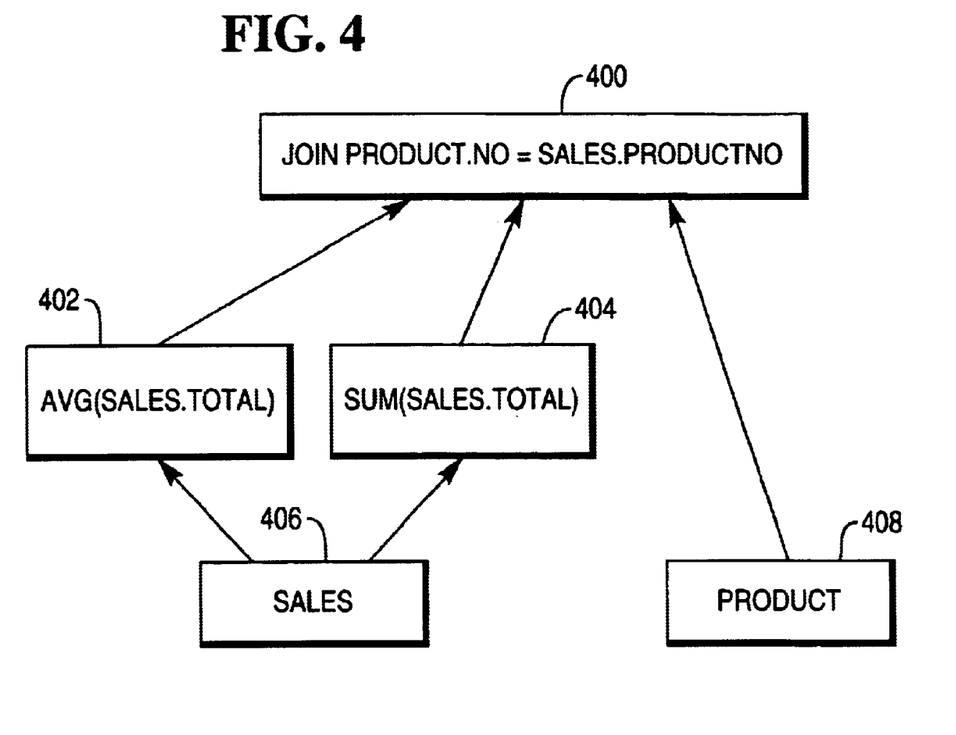
Figure 5:
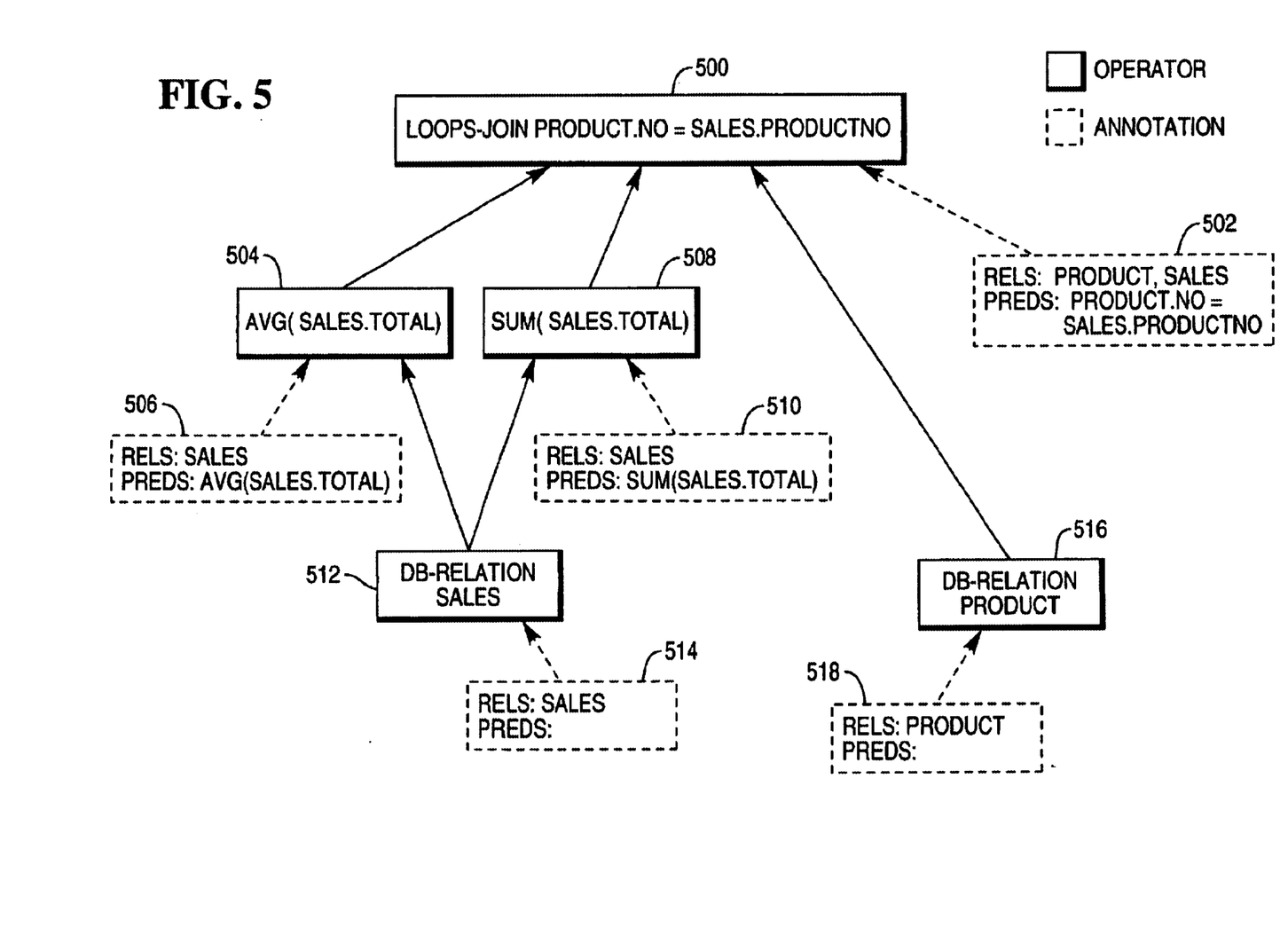

FIGS. 3, 4, and 5 present an example SQL query, an associated operator tree, and an associated access plan. The SQL query of FIG. 3 is converted from its textual form to one or more equivalent operator trees as shown in FIG. 4, and each of the operator trees can be represented as one or more access plans as shown in FIG. 5. During the query optimization process, the query coordinator 108 must generate various operator trees that represent the SQL query (or parts of it), generate the various access plans corresponding to each operator tree, and compute/estimate various properties of the operator trees and access plans (for example, cardinality of the output relation, estimated execution cost, etc.) in order to select an optimal access plan.

FIG. 4 illustrates an operator tree generated from the query shown in FIG. 3, wherein the operator tree includes nodes 400, 402, 404, 406, and 408. The two DB-RELATION nodes 406 and 408 represent the two relations in the FROM clause of the query, i.e., "SALES" and "PRODUCT". The AVG node 402 and SUM node 404 represent aggregate functions, i.e., average and sum functions, on the "SALES" relation, and the JOIN node 400 represents the "PRODUCT" relation being joined to the results of the average and sum functions on the "SALES" relation.

FIG. 5 illustrates an annotated access plan generated from the operator tree shown in FIG. 4, wherein the annotated access plan includes nodes 500, 502, 504, 506, 508, 510, 512, 514, 516 and 518. The access plan specifies the operators to be executed, the expressions and predicates to be evaluated, and the aggregations to be performed. Furthermore, the access plan expresses the dependencies between operators by organizing the nodes 500, 504, 508, 512, and 516 representing the operators in the form of a tree. The annotations 502, 506, 510, 514 and 518 in the access plan further describe the expressions and aggregations required for the access plan.

The query coordinator 108 evaluates the access plan using a "tree of operators" approach. In this approach, the operator nodes 500, 504, 508, 512 and 516 accept streams of tuples as inputs, operate on these tuples, and then produce modified streams of tuples as outputs. The edges in the access plan describe the flow of the tuple streams through the access plan: (1) node 516 produces tuples for node 500; (2) node 512 produces tuples for nodes 504 and 508; (3) node 508 produces tuples for node 500; and (4) node 504 produces tuples for node 500.

The access plan is executed by generating an instance of the appropriate operator for each node in the tree, with each of these instances executing in an independent thread on the same or a different machine. Streams connect these instances and move data from one operator to another operator in a pipelined fashion. Finally, the results are pipelined to the consumer (e.g., application program 102 and/or cache 104) in tandem with the execution of the operators. All operators operate in a "push" fashion, in which data flows upwards to operators higher in the access plan.

EXCEPTION PROPAGATION

The present invention provides mechanisms for handling exception propagation when a tree of operators is executing in a pipelined fashion. Since the operators are executed asynchronously in an independent fashion, exceptions such as abnormal conditions or errors are dynamically propagated from a source operator to related operators. However, this propagation does not affect other operators executing for different queries.

The mechanisms for handling exception propagation and shutdown are classified into four main categories: detection, propagation, delivery, and termination. Each of these categories is described in more detail below.

With regard to detection, exceptions can occur because of various reasons: resource exhaustion, a client application 102 choosing to abort, corrupted values in tuples during expression evaluation, etc.

With regard to propagation, exceptions can occur in operators located anywhere in the tree. However, operators operate in a "push" fashion, in which data flows upwards to operators higher in the operator tree. On the other hand, exception propagation requires a bi-directional flow, since errors must sometimes be propagated downward as well as upward in the tree. Specifically, exceptions may be propagated to operators transitively feeding to the erroneous operator (downstream) as well as to operators transitively fed from the erroneous operator (upstream). In addition, propagation needs to be as transparent as possible to the code for the operator.

In the present invention, propagation is handled by recycling empty data pages that had previously been used to transmit data upwards in the tree and piggybacking exceptions onto these recycled data pages. The major advantages of recycling empty data pages include the efficient realization of bi-directional flow, bounded use of memory, and elimination of the cost of allocation and de-allocaton of memory.

With regard to delivery, recall that each operator executes in an independent thread of its own. Since the threads are either scheduled by an operating system or by a user-level thread manager on the same or a different machine, there may be little control over the scheduling of threads. Hence, the threads should not be interrupted by attempting instantaneous delivery of the exceptions.

Instead, the present invention uses well-defined execution points to interrupt the operator's thread. Specifically, delivery is accomplished without interrupting the operator's thread, by delivering exceptions piggybacked on the recycled data pages at one or more points at which the operator normally reads and writes tuples from its input stream With regard to termination, once the exception is delivered, the operators have to be terminated and the resources held by each operator have to be released. In the case of a normal termination, a "wait" is performed against a final operator feeding the client application 102 to ensure that all the other operators have completed their processing before termination occurs. However, in the case of an abnormal termination, the order in which the operators terminate can be random.

To ensure that all operators terminate and release resources properly, the present invention uses a depth-first traversal of the operator tree, along with a persistent state variable that tracks whether the thread has terminated or not and that survives the termination of an operator. During the traversal, each operator is checked to determine whether its corresponding thread has terminated by examining the persistent state variable, and then termination is initiated.

LOGIC OF THE PREFERRED EMBODIMENT

Figure 6A:
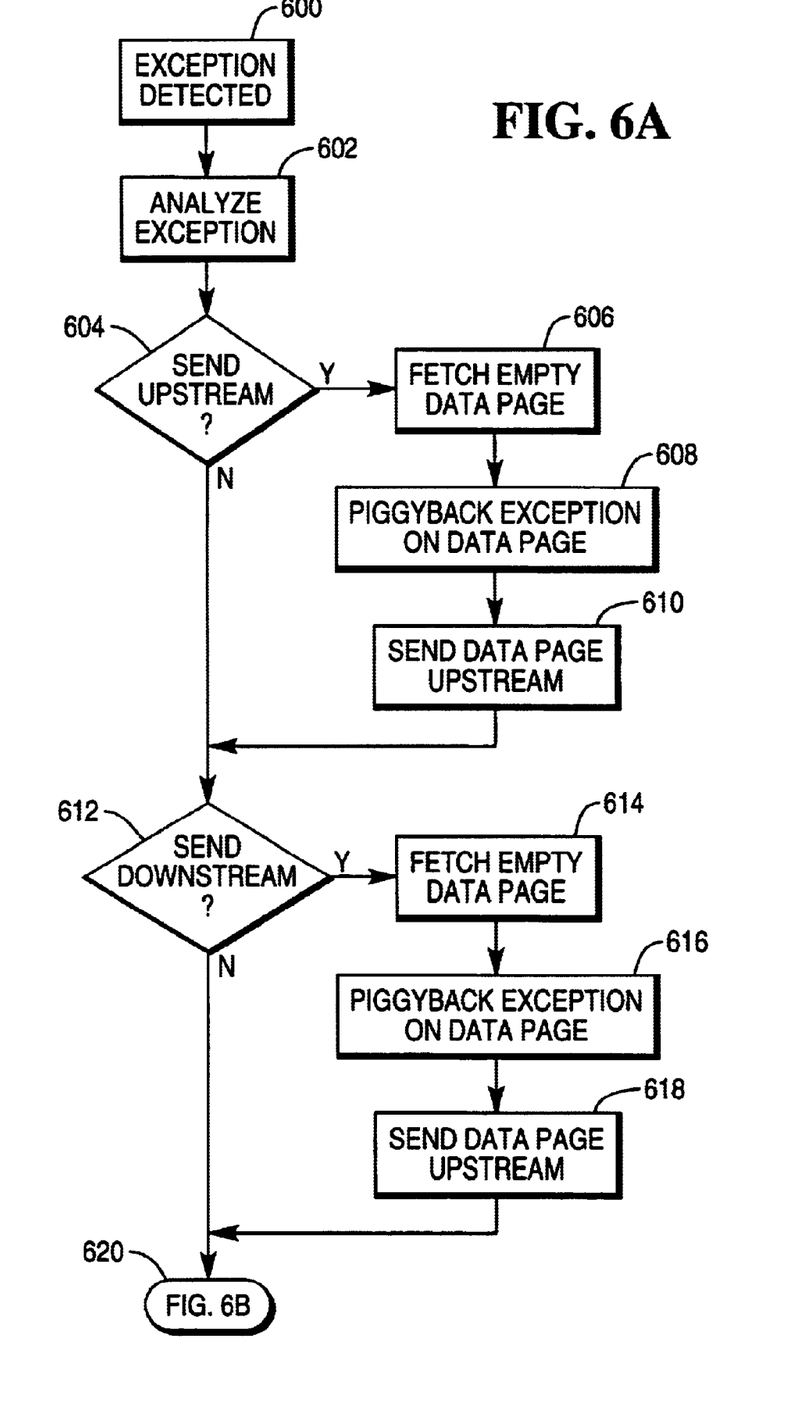
FIGS. 6A, 6B, and 6C are flowcharts that illustrate the logic performed according to the preferred embodiment of the present invention.
Figure 6B:
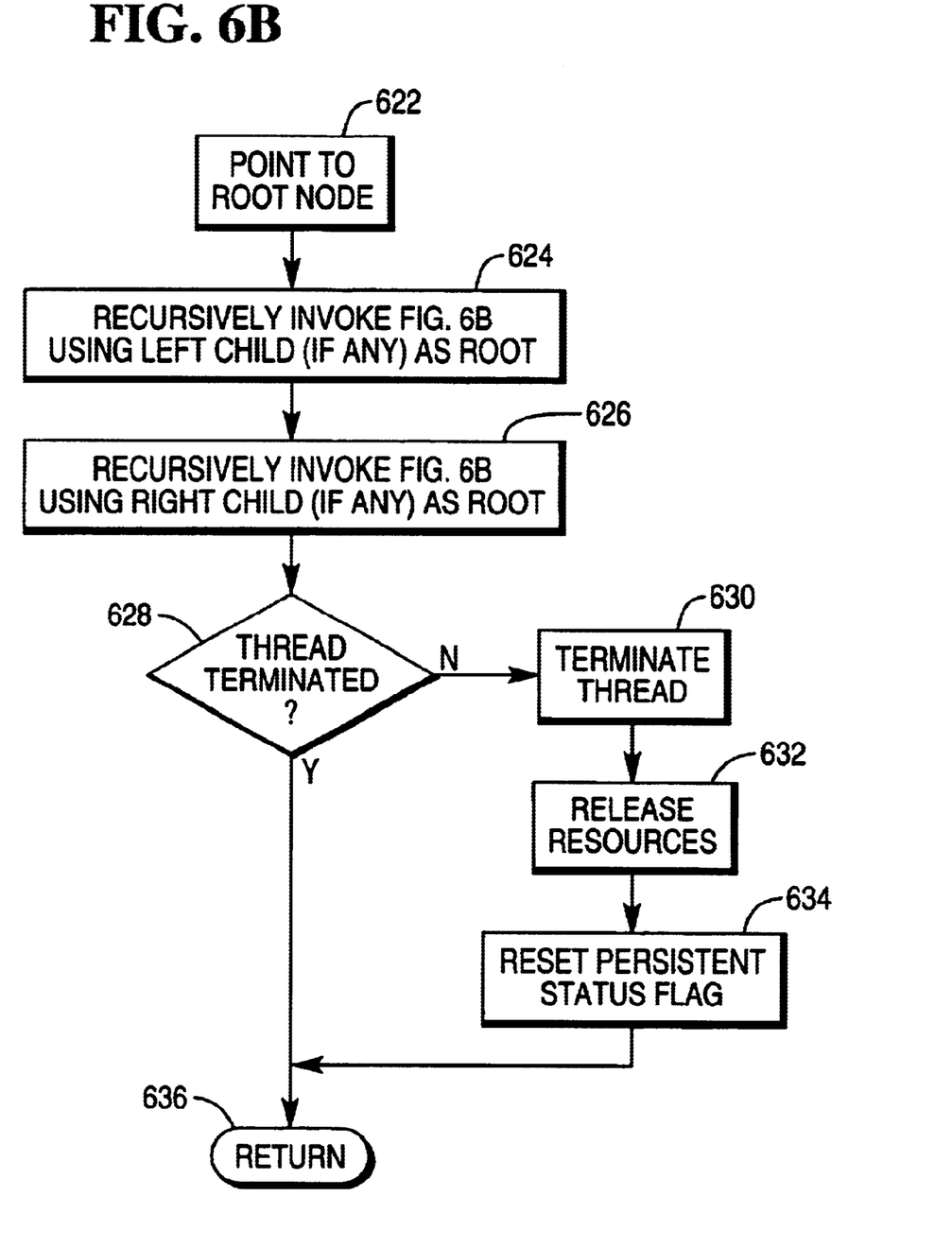
Figure 6C:
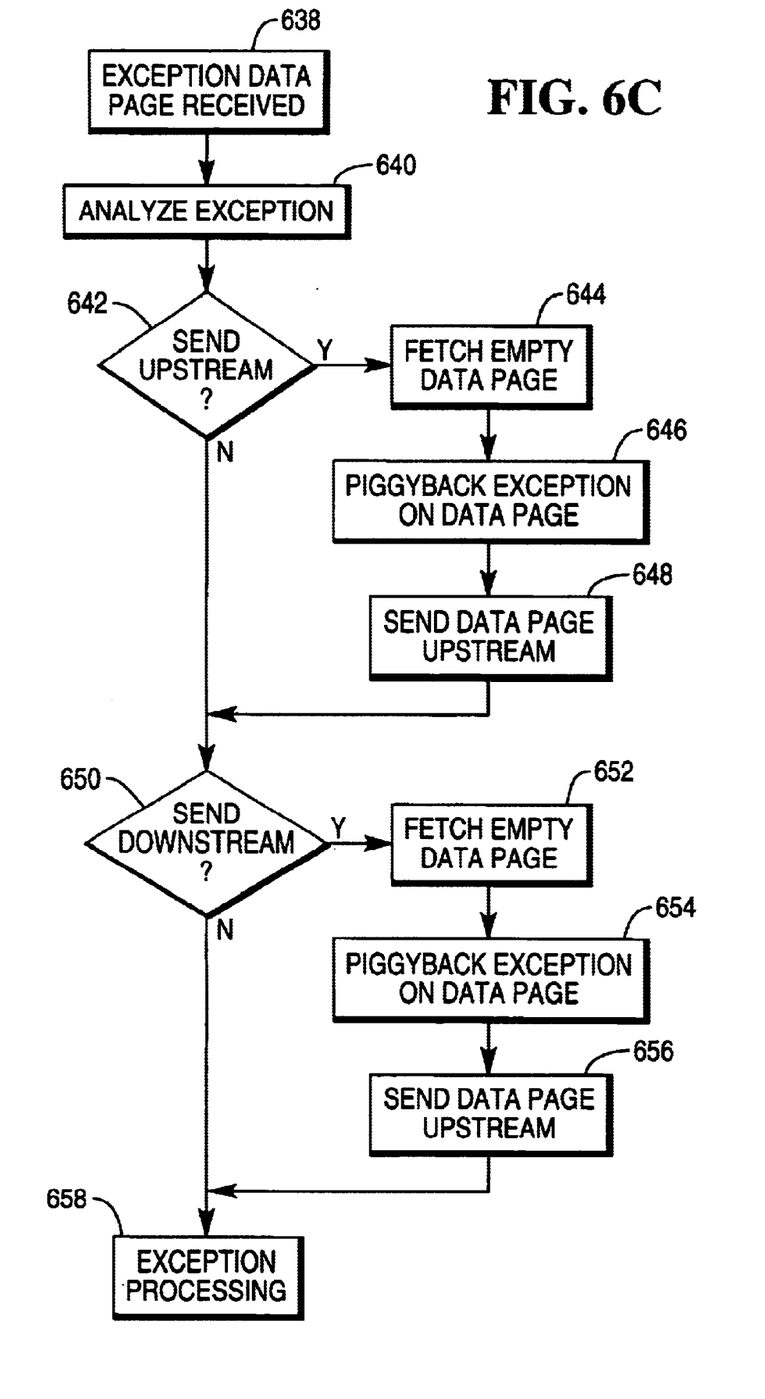

FIGS. 6A, 6B, and 6C are flowcharts that illustrate the logic performed according to the preferred embodiment of the present invention. Those skilled in the art will recognize that this logic is provided for illustrative purposes only and that different logic may be used to accomplish the same results.

FIG. 6A illustrates the logic performed by the operator instance where the exception occurs. In this flowchart, the exception is detected and propagated, and then termination of the entire operator tree is initiated.

Block 600 represents an exception being detected within a thread executing an operator instance.

Block 602 represents the exception being analyzed after it is detected.

Block 604 is a decision block that determines whether the exception should be propagated upstream. If so, control transfers to Block 606; otherwise, control transfers to Block 612.

Block 606 represents an empty data page being fetched, so that it can be recycled in exception propagation.

Block 608 represents the exception being piggybacked on the recycled data page. In this regard, the exception may be represented by one or more values stored within the recycled data page, or it may be presented by signaling associated with the transmission of the recycled data page.

Block 610 represents the recycled data page being transmitted to the next operator upstream in the operator tree.

Block 612 is a decision block that determines whether the exception should be propagated downstream. If so, control transfers to Block 612; otherwise, control transfers to Block 620.

Block 614 represents an empty data page being fetched, so that it can be recycled in exception propagation.

Block 616 represents the exception being piggybacked on the recycled data page. In this regard, the exception may be represented by one or more values stored within the recycled data page, or it may be presented by signaling associated with the transmission of the recycled data page.

Block 618 represents the recycled data page being transmitted to the next operator downstream in the operator tree.

Block 620 represents control being transferred to FIG. 6B.

FIG. 6B illustrates the logic performed by the operator instance where the exception occurs. In this flowchart, the depth-first traversal of the operator tree occurs through recursion, and each operator node in the operator tree is terminated.

Block 622 represents a pointer being set to the current root node of the operator tree.

Block 624 represents the logic of FIG. 6B being recursively invoked using the next left child node (if any) as the current root node. Upon return from the recursive invocation, or if the logic of FIG. 6B is not invoked because there is no next left child node, then control transfers to Block 626.

Block 626 represents the logic of FIG. 6B being recursively invoked using the next right child node (if any) as the current root node. Upon return from the recursive invocation, or if the logic of FIG. 6B is not invoked because there is no next right child node, then control transfers to Block 628.

Block 628 is a decision block that determines whether the thread associated with the current root node has been terminated. If not, control transfers to Block 630; otherwise, control transfers to Block 636.

Block 630 represents the thread being terminated.

Block 632 represents the resources of the terminated thread being released.

Block 634 represents the persistent status flag of the thread being reset to indicate that the thread is no longer active.

Block 636 represents the logic returning to the calling point.

FIG. 6C illustrates the logic performed by an operator instance that receives a notification of the exception. In this flowchart, the recycled data page with the piggybacked exception is received, the exception is further propagated, and then processed.

Block 638 represents a data page being received at an executing operator instance with an exception piggybacking thereon.

Block 640 represents the exception being analyzed after it is received.

Block 642 is a decision block that determines whether the exception should be propagated upstream. If so, control transfers to Block 644; otherwise, control transfers to Block 650.

Block 644 represents an empty data page being fetched, so that it can be recycled in exception propagation.

Block 646 represents the exception being piggybacked on the recycled data page. In this regard, the exception may be represented by one or more values stored within the recycled data page, or it may be presented by signaling associated with the transmission of the recycled data page.

Block 648 represents the recycled data page being transmitted to the next operator upstream in the operator tree.

Block 650 is a decision block that determines whether the exception should be propagated downstream. If so, control transfers to Block 652; otherwise, control transfers to Block 658.

Block 652 represents an empty data page being fetched, so that it can be recycled in exception propagation. Block 654 represents the exception being piggybacked on the recycled data page. In this regard, the exception may be represented by one or more values stored within the recycled data page, or it may be presented by signaling associated with the transmission of the recycled data page.

Block 656 represents the recycled data page being transmitted to the next operator downstream in the operator tree.

Block 658 represents the exception being processed further, if necessary.

CONCLUSION

This concludes the description of the preferred embodiment of the invention. The following paragraphs describe some alternative embodiments for accomplishing the same invention.

In one alternative embodiment, any type of computer could be used to implement the present invention. In addition, any database management system, decision support system, on-line analytic processing system, or other computer program that performs similar functions could be used with the present invention.

In summary, the present invention discloses an On-Line Analytic Processing (OLAP) system that converts queries into an operator tree comprised of a plurality of operators, wherein each of the operators independently executing. When an exception is detected in one or more of the independently executed operators, the exception is propagated to the remaining operators of the query by recycling empty data pages, piggybacking the detected exceptions on the recycled data pages, and sending the recycled data pages both upstream and downstream in the operator tree to the remaining operators of the query. The propagated exceptions are delivered to the remaining operators, without interrupting the operators, at one or more points at which the operator normally reads or writes data from its input stream. Finally, the operators are terminated using a depth-first traversal of the operator tree.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What claimed is:

1. A method for performing queries in an on-line analytical processing (OLAP) system, comprising:
    (a) translating the query into an operator tree comprised of a plurality of operators;

(b) independently executing each of the operators in the operator tree;

(c) detecting an exception in one or more of the independently executed operators of the operator tree; and (d) propating the detected exceptions to remaining ones of the independently executed operators of the operator tree by recycling empty data pages, piggybacking the detected exceptions on the recycled data pages, and sending the recycled data pages to the remaining ones of the independently executed operators of the operator tree in a bi-directional flow, wherein the detected exceptions are propagated downward as well as upward in the operator tree.

2. The method of than 1, wherein streams connect the independently executed operators, and move data from one operator to another operator in a pipelined fashion.

3. The method of claim 1, wherein the independently executed operators operate in a push fashion, in which data flows upwards to operators higher in the operator tree.

4. The method of claim 1, wherein the propagating step comprise propagating the detected exceptions to the remaining ones of the independently executed operators transitively feeding to the operator that detected the exceptions as well as to the remaining ones of the independently executed operators transitively red from the operator that detected the exceptions.

5. The method of claim 1, wherein the recycled data pages were previously used to transmit data upwards in the operator tree.

6. The method of claim 1, further comprising delivering the propagated exceptions to each of the remaining ones of the independently executed operators of the operator tree, without interrupting the operators.

7. The method of claim 1, wherein the delivering step comprises delivering the propagated exceptions to each of the remaining ones of the independently executed operators of the operator tree, without interupting the operators, by delivering exceptions piggybacked on the recycled data pages at one or more points at which the operator normally reads or wastes data from its input stream.

8. The method of claim 1, further comprising terminating the operators using a depth-first traversal of the operator tree.

9. The method of claim 1, wherein each of the operators of the operator tree includes a persistent state variable that tracks whether the operator has terminated or not, and that survives the termination of an operator.

10. The method of claim 9, wherein the persistent state variable is checked during the depth-first traversal to determine whether the operator has terminated.

11. An on-line analytical processing (OLAP) system that performs queries, comprising:

(a) a computer system;

(b) logic, performed by the computer system, for:

(1) translating the query into an operator tree comprised of a plurality of operators;

(2) independently executing each of the operators in the operator tree;

(3) detecting an exception in one or more of the independently executed operators of the operator tree; and (4) propagating the detected exceptions to remaining ones of the independently executed operators of the operator tree by recycling empty data pages, piggybacking the detected exceptions on the recycled data pages, and sending the recycled data pages to the remaining ones of the independently executed operators of the operator tree in a bi-directional flow, wherein the detected exceptions are propagated downward as well as upward in the operator tree.

12. An article of manufacture embodying logic for performing queries in an on-line analytical processing (OLAP) system, the logic comprising:

(a) translating the query into an operator tree comprised of a plurality of operators;

(b) independently executing each of the operators in the operator tree;

(c) detecting an exception in one or more of the independently executed operators of the operator tree; and (d) propagating the detected exceptions to remaining ones of the independently executed operators of the operator tree by reducing empty data pages, piggybacking the detected exceptions on the recycled data pages, and sending the recycled data pages to the remaining ones of the independently executed operators of the operator tree in a bi-directional flow, wherein the detected exceptions are propagated downward as well as upward in the operator tree.

13. The system of claim 11, wherein streams connect the independently executed operators, and more data from one operator to another operator in a pipelined fashion.

14. The system of claim 11, wherein the independently executed operators operate in a push fashion, in which data flows upwards to operators higher in the operator tree.

15. The system of claim 11, wherein the logic for propagating comprises logic for propagating the detected exceptions to the remaining ones of the independently executed operators transitively feeding to the operator that detected the exceptions as well as to the remaining ones of the independently executed operators transitively fed from the operator that detected the exceptions.

16. The system of claim 11, wherein the recycled data pages were previously used to transmit data upwards in the operator tree.

17. The system of claim 11, further comprising logic for delivering the propagated exceptions to each of the remaining ones of the independently executed operators of the operator tree, without interrupting the operators.

18. The system of claim 11, wherein the logic for delivering comprises logic for delivering the propagated exceptions to each of the remaining ones of the independently executed operators of the operator tree, without interrupting the operators, by delivering exceptions piggybacked on the recycled data pages at one or mote points at which the operator normally reads or writes data from its input stream.

19. The system of claim 11, further comprising logic for terminating the operators using a depth-first traversal of the operator tree.

20. The system of claim 11, wherein each of the operators of the operator tree includes a persistent state variable that tracks whether the operator has terminated or not, and that survives the termination of an operator.

21. The system of claim 20, wherein the persistent state variable is checked during the depth-first traversal to determine whether the operator has terminated.

22. The article of manufacture of claim 12, wherein streams connect the independently executed operators, and move data from one operator to another operator in a piplined fashion.

23. The article of manufacture of claim 12, wherein the independently executed operators operate in a push fashion, in which data flows upwards to operators higher in the operator tree.

24. The article of manufacture of claim 12, wherein the propagating step comprises propagating the detected exceptions to the remaining ones of the independently executed operators transitively feeding to the operator that detected the exceptions as well as to the remaining ones of the independently executed operators transitively fed from the operator that detected the exceptions.

25. The article of manufacture of claim 12, wherein the recycled data pages were previously used to transit data upwards in the operator tree.

26. The article of manufacture of claim 12, further comprising delivering the propagated exceptions to each of the remaining ones of the independently executed operators of the operator tree, without interrupting the operators.

27. The article of manufacture of claim 12, wherein the delivering step comprises delivering the propagated exceptions to each of the remaining ones of the independently executed operators of the operator tree, without interupting the operators, by delivering exceptions piggybacked on the recycled darn pages at one or more points at which tie operator nominally reads or writes data from its input stream.

28. The article of manufacture of claim 12, further comprising terminating the operators using a depth-first traversal of the operator tree.

29. The article of manufacture of claim 12, wherein each of the operators of the operator tree includes a persistent state variable that tracks whetter the operator has terminated or not, and that survives the termination of an operator.

30. The article of manufacture of claim 29, wherein the persistent state variable is checked during the depth-first traversal to determine whether the operator has terminated.

* * * * *

UNITED STATES PATENT AND TRADEMARK OFFICE
CERTIFICATE OF CORRECTION

PATENT NO. : 6,678,672 B1
DATED : January 13, 2004
INVENTOR(S) : K. Ramasamy et al.

It is certified that error appears in the above-identified patent and that said Letters Patent is hereby corrected as shown below:

Column 9,
Line 25, after "transitively" delete "red" and insert -- fed --

Column 12,
Line 2, after "recycled" delete "darn" and insert -- data --
Line 3, after "operator" delete "nominally" and insert -- normally --

Signed and Sealed this

Eighteenth Day of January, 2005

JON W. DUDAS
*Director of the United States Patent and Trademark Office*